United States Patent [19]
Piet

[11] 3,731,905
[45] May 8, 1973

[54] POPPET VALVE STRUCTURE HAVING O-RING SEAT SEAL
[75] Inventor: Meyer Piet, Arcadia, Calif.
[73] Assignee: Futurecraft Corporation, Industry, Calif.
[22] Filed: Nov. 3, 1971
[21] Appl. No.: 195,247

[52] U.S. Cl. ..................251/333, 251/251, 251/284, 251/DIG. 1, 137/625.27
[51] Int. Cl..............................................F16k 43/00
[58] Field of Search.....................251/334, 333, 318, 251/DIG. 1

[56] References Cited
UNITED STATES PATENTS

| 1,196,996 | 9/1916 | Van Deusen | 251/334 |
| 3,177,981 | 4/1965 | Porter | 251/334 X |
| 3,403,698 | 10/1968 | Klun | 251/334 X |
| 3,583,427 | 6/1971 | Taulier | 251/334 |

Primary Examiner—Henry T. Klinksiek
Assistant Examiner—Robert J. Miller
Attorney—Whann & McManigal

[57] ABSTRACT

A poppet valve structure preferably for controlling flow of low pressure fluids, which is adapted for use in a multiplicity of valve arrangements, and embodies valve seat and valve members concentrically associated and alternately axially movable to valve closed and valve opened positions, one of the members having a circumferential groove of substantially semicircular cross-section for receiving a circumferential peripheral portion of an O-ring of circular cross-section without distortion, and so that substantially half the cross-sectional area circumferentially projects, the other member having a circular seating surface engageable and disengageable with respect to the projecting portion of the ring adjacent one wall of the groove, the other wall of the groove being extended to provide a back-up surface on the opposite side of the ring from the seating surface, and the seating surface and back-up surface providing a radial flow space for the ring material exteriorly of the groove. In some cases, a stop is provided for limiting the extent of movement of the members towards valve closed position.

6 Claims, 5 Drawing Figures

PATENTED MAY 8 1973 3,731,905

MEYER PIET
INVENTOR
WHANN & McMANIGAL
Attorneys for Applicant
BY

POPPET VALVE STRUCTURE HAVING O-RING SEAT SEAL

BACKGROUND OF THE INVENTION

The invention relates generally to the field of valves.

Heretofore, it has been the usual practice to construct low pressure poppet valves so as to utilize flat sealing washers as a sealing medium between a valve member and seating surface. The use of such washers requires the provision of anchoring means such as screws with retaining washers and the like, and such securing means are not always easily released for replacement of the washer, and further require the use of tools to make the replacement.

Having in mind the problems in the foregoing structures, the present invention makes use of an O-ring which is anchored and supported in such a manner that it can be removed and snapped into an operating position without the use of tools or the provision of special securing devices. The O-ring is supported within a groove which intimately embraces a peripheral portion of the ring and supports the ring without distorting its normal configuration so that it has a circumferentially radially projecting portion which is arranged to be engaged on its opposed axial sides between a back-up surface and a valve seat surface, which coact to form a circumferentially extending space for radial flow of the ring material exteriorly of the supporting groove. Such an arrangement not only simplifies the valve structure, but enables rapid and quick replacement of the ring seals, and it has been found that such rings provide a very effective seal, particularly in connection with the valving of relatively low pressure fluids.

SUMMARY OF THE INVENTION

The present invention relates generally to valves, and is more particularly concerned with a valving arrangement for low pressure fluids, which utilizes a unique O-ring seat seal arrangement.

Having in mind the disadvantages of prior low pressure seals utilizing flat washers, it is an object of the present invention to provide a unique poppet valve structure which makes use of an O-ring seat seal.

A further object of the invention is to provide a unique poppet valve according to the foregoing object, which can be utilized in a basic assembly for incorporation in a multiplicity of valve arrangements, such as foot valves, selector valves, three-way valves, four-way valves, and the like.

A further object resides in the provision of an improved low pressure fluid valve, which incorporates a structure utilizing an O-ring as a sealing medium, and which can be snapped into and out of operative position without the need for additional tools.

Another object is to provide a low pressure fluid control valve in which one of the valving members is provided with a groove for circumferentially receiving the periphery of an O-ring therein without distortion, the engaged portions of the ring and groove being complementary and supporting the ring with a projecting portion adapted to be axially compressed between an associated seating surface and a back-up surface which provide a flow space exteriorly of the groove for flow of the ring material.

Still another object is to provide a stop member for limiting the compressive sealing forces applied to the ring in valve closed position.

Further objects and advantages of the invention will be brought out in the following part of the specification, wherein detailed description is for the purpose of disclosing a basic structure and several embodiments of the invention without placing limitations thereon.

BRIEF DESCRIPTION OF THE DRAWINGS

Referring to the accompanying drawings, which are for illustrative purposes only.

DESCRIPTION OF THE EMBODIMENTS

Figure 1:
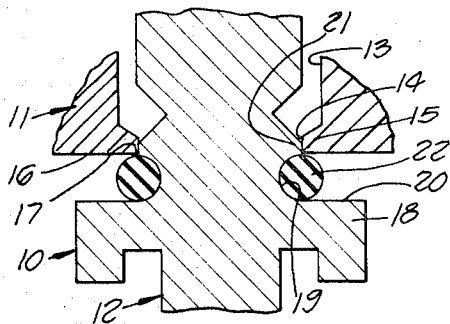
FIG. 1 is an enlarged fragmentary sectional view diagrammatically showing valving components according to the present invention in initially engaged position.

Referring more specifically to the drawings, there is illustrated in FIG. 1 a valving structure, as generally indicated at 10, which embodies the features of the present invention. As there shown, the valving structure comprises a valve seat member 11 and an operatively associated valve member 12 which in practical form is constructed as a slide member.

The valve seat member 11 in practical embodiments may be constructed in a variety of forms, but basically will include a generally tubular structure with an axial passage 13 therein which is in communication with a restricted port opening 14 defined by an integral annulus 15. Adjacent the port opening, the annulus is formed with a circumferentially extending radial seating surface 16 which preferably terminates in a sharp edge 17 at the port opening.

The valve member 12 is of generally cylindrical configuration and is provided with an annular shoulder 18 of a diameter greater than the diameter of the port opening 14.

The valve member 12 extends through the port opening 14 and is coaxial with the axis of the port opening, means being provided in the valve devices for supporting the valve member for axial movements in opposite directions. On the side of the shoulder 18 facing the port opening, the valve member is provided with a circumferentially extending groove 19 which extends from the inner margin of the adjacent surface 20 of the shoulder 18 to an axially spaced circumferentially extending groove wall 21 of slightly less diameter than the diameter of the port opening 14 in order that the wall may be closely slidable within the port opening.

As thus constructed, the groove 19 opens radially outwardly and is adapted to receive therein the inner peripheral portion of an O-ring 22. The received portion of the ring and the surface of the groove are complementary, and in this case are shown as being transversely of semicircular configuration. The ring and groove are intimately engaged so as to securely anchor the ring in position without distorting the ring material.

Figure 2:
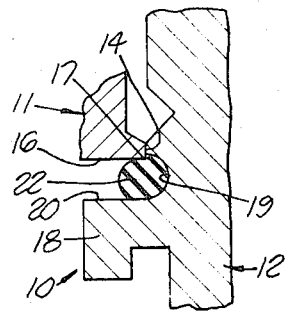
FIG. 2 is a similar view showing the components in final sealing engagement.

As thus mounted, the outer peripheral portion of the ring projects beyond the edge 17 defined by the port opening. As shown, with a ring of circular cross-section, approximately half of the ring material projects outwardly from the groove. As shown in FIG. 1, where the sealing ring is in its initial port opening closing position, the outer peripheral portion will be engaged on axially opposite sides of the ring by the seating surface 16 on one side and the surface 20 on the opposite side, the surface 20 providing in this case a back-up surface and cooperating with the seating surface to provide a circumferentially extending radial space within which the outer material of the ring periphery may readily flow, when the valve seat and valve member are moved into fully sealed position as shown in FIG. 2.

The mounting of an O-ring in the manner described above and the use of a back-up surface provides a sealing member which operates very efficiently for control of low pressure fluids, and eliminates the use of parts which require the use of tools for anchoring the sealing member as in the case of the usually utilized flat washer type of seal. In order to replace or renew the sealing ring, it is merely necessary to disengage the old one by slipping it out of the anchor groove, and then snap in a new one.

The simplicity and effectiveness of the valve structure as described above makes it readily adaptable for use in a variety of low pressure fluid valve control devices, a number of which will now be described as being exemplary.

Figure 3:
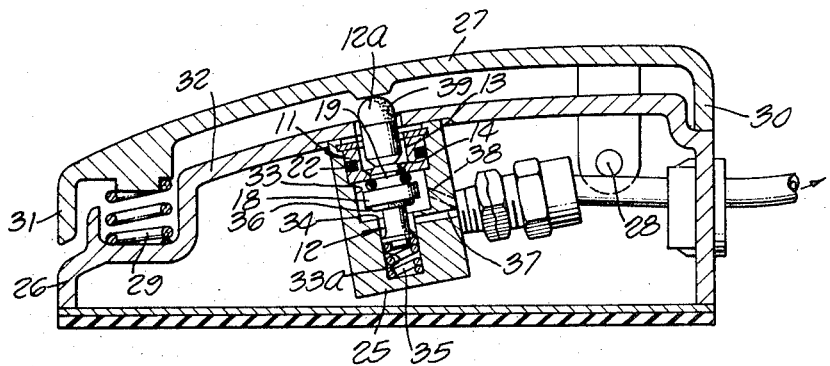
FIG. 3 is a sectional view of a foot valve device embodying the features of the valving structure of the present invention.

As shown in FIG. 3, the valving arrangement is embodied in a foot valve in which a valve body 25 is supported within a generally flat hollow casing or housing 26, this housing having a foot engageable pedal 27 hingedly mounted at the top of the housing as by a hinge pivot 28 for limited swinging movement, the treadle being normally urged in a clockwise direction by means of a compression spring 29 at the forward end of the treadle. Movement in clockwise direction is limited by a depending rear flange 30, which is adapted to engage an adjacent portion of the housing, while swinging movement in a counter-clockwise direction is limited by a front flange 31 which is adapted to engage an adjacent portion of the housing.

The valve body is suspended within the housing from a top wall 32 and is fabricated to provide an internal cavity 33, this cavity at one end being provided with an annular seat 34 which defines a port opening 14 having communication with an end cavity 33a. At the opposite side of the cavity 33 there is provided a tubular valve seat member 11 which is peripherally sealed and incorporates an axial passage 13, port opening 14, annular shoulder 18, groove 19, and O-ring 22, all as previously described. The valve or slide member 12 in this case extends through the port openings and has a projecting end 12a engaged by the treadle 27. Normally, the slide member is urged into a position closing the upper port 14 by means of a compression spring 35 in the end cavity 33a. Movement of the shoulder 28 downwardly against the force of the spring 35 is arranged to carry a sealing member 36 thereon into valve closed relation with the sharp edge 34.

In this embodiment, the cavity 33a is shown as being connected through a passage 37 with a fluid pressure source connection, cavity 33 being connected through a passage 38 to a pressurized fluid delivery connection. The axial passage 13 connects with an opening 39 in the top wall 32, and in this case forms an atmospheric vent outlet.

In the foregoing arrangement, with the treadle 27 in raised position, flow communication is established between the cavities 33 and 33a. With the treadle depressed, the cavity 33 is connected with the passage 13 and the opening 39.

Figure 4:
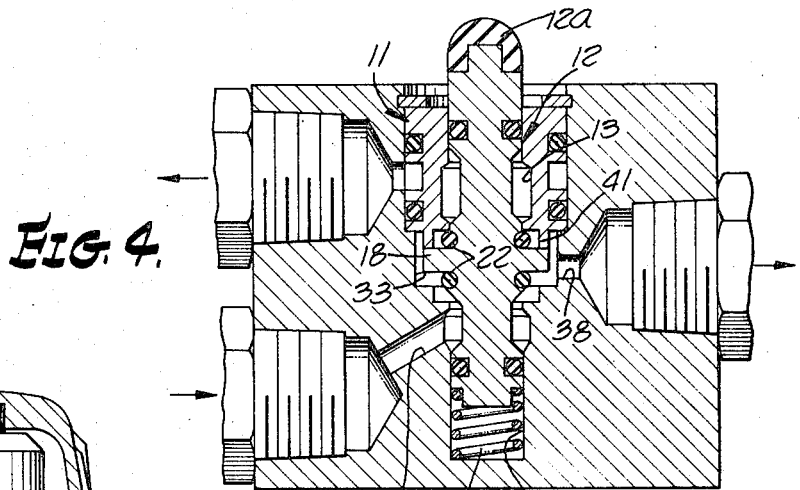
FIG. 4 is an enlarged sectional view showing a modified valve device in which the features of the herein described invention are utilized to control a pair of port openings.

In FIG. 4, there is disclosed a modified valving structure which may be utilized in the foot valve of FIG. 3 instead of the arrangement shown. In the modified arrangement of FIG. 4, the vent through the opening 39 at the upper end 12a of the slide member has been eliminated, and the valve seat member 11 arranged to seal the outer end of passage 13 and connect it through a vent connection passage 40. Also, the slide member shoulder 18 is in this case provided with similarly mounted O-ring seals 22 on its opposite sides for association with similar valve seat arrangements. In this embodiment, however, a stop flange 41 is provided on the valve seat member 11 to limit the extent of movement of the shoulder 18 in the valve closed position. This stop flange limits the amount of pressure which will be applied against the adjacent seal ring in the closed position of the valve.

Figure 5:
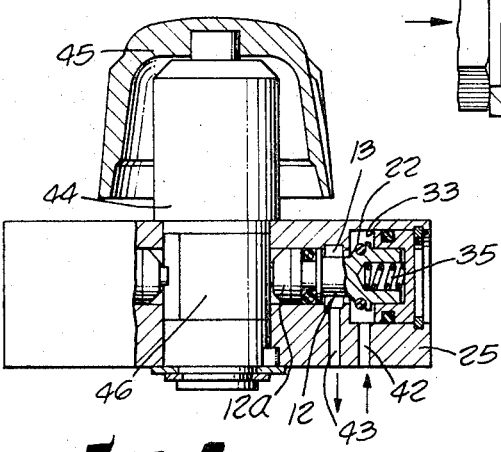
FIG. 5 is a view illustrating the incorporation of components according to the present invention in a selector valve device.

In FIG. 5, there is illustrated a manually operable selector valve which may utilize a plurality of the valve structures for selectively opening and closing a flow connection for low pressurized fluid. In this embodiment, the cavity 33 is in communication with an inlet passage 42, and the passage 13 is in communication with an outlet passage 43. For actuating the slide member 12 into valve open position, there is provided a spindle 44 which is rotatably supported in appropriate manner in the body 25 and which externally carries a knob 45 by means of which the spindle may be manually rotated as desired. Within the valve body 25, the spindle mounts an eccentric member 46 which has camming relation with the projecting ends 12a of the respective slide members of the valving units. Thus, as the spindle 44 is rotated, the eccentric member 46 will operate to successively cam the slide members into valve open positions and interconnect the associated cavities 33 and 13 thereof. Upon removal of the camming action, the associated compression spring 35 will move the slide member to valve closed position.

From the foregoing description and drawings, it will be clearly evident that the delineated objects and features of the invention will be accomplished.

Various modifications may suggest themselves to those skilled in the art without departing from the spirit of the invention, and, hence it is not wished to restrict the same to the specific forms shown or uses mentioned, except to the extent indicated in the appended claims.

I claim:

1. A valve structure for controlling a flow passage, comprising:
   a. an operatively associated circular valve seat member and a circular valve member supported in concentric relation for relative axial movement to valve closed and valve opened positions;
   b. an O-ring;

c. one of said members having a radially opening circumferential groove for receiving the O-ring therein in an undistorted condition with its received periphery and opposite sides respectively engaged with the bottom and sides of the groove, one side wall of said groove being of such radial depth that substantially one-half the cross sectional area of the ring circumferentially projects radially therebeyond;

d. the other of said members having a radial circumferential seating surface engageable and disengageable with respect to projecting portions of said ring adjacent said one side wall; and e. a radial circumferentially extending back-up surface carried by said one of said members positioned on the opposite side of said ring from said seating surface.

2. A valve structure according to claim 1, wherein said groove and the received portion of said ring have complementary engageable surfaces.

3. A valve structure according to claim 2, in which the engaged surfaces are of semicircular configuration.

4. A valve structure according to claim 2, wherein the back-up surface comprises an extension of the groove surface of the other side wall of the groove.

5. A valve structure according to claim 4, in which said back-up surface and said seating surface cooperate to provide a radial flow space for the O-ring material externally of said groove in valve closed position.

6. A valve device, comprising:

a. a body having an internal cavity;

b. an annular valve seat in a wall of said cavity defining a port opening;

c. a slide member in said port opening comprising an annular shoulder in said cavity of a diameter greater than the diameter of said port opening, said shoulder being axially movable by said slide member into valve closed and valve opened relation with said seat;

d. a radially outwardly opening circumferential groove in the slide member on the seat side of said shoulder, said groove extending between said shoulder and a spaced groove wall of a diameter slightly less than the diameter of the port opening;

e. a ring of resilient material having its inner periphery seated in said groove in an undistorted condition, said engaged ring and groove surfaces being complementary, and the ring in seated position having an outer peripheral projecting portion of a diameter greater than the diameter of said port opening, whereby in valve closed position outer peripheral portions of said ring are axially compressed in the space between said seating surface and said shoulder;

f. spring means normally urging said slide member towards valve closed position; and g. manually actuated means operable to move said slide member towards valve open position.

* * * * *